United States Patent [19]

Mittelhäuser et al.

[11] Patent Number: 4,836,490

[45] Date of Patent: Jun. 6, 1989

[54] EXTERIOR MIRROR FOR A VEHICLE

[75] Inventors: Bernhard Mittelhäuser, Am Krähenberg, D-3002 Wedemark 2; Bernd Winkler, Burgwedel, both of Fed. Rep. of Germany

[73] Assignee: Bernhard Mittelhäuser, Wedemark, Fed. Rep. of Germany

[21] Appl. No.: 184,974

[22] Filed: Apr. 22, 1988

[30] Foreign Application Priority Data

Apr. 24, 1987 [DE] Fed. Rep. of Germany ....... 3713690

[51] Int. Cl.$^4$ .............................................. A47G 1/16
[52] U.S. Cl. .................. 248/549; 248/475.1; 350/632
[58] Field of Search .............. 248/549, 475.1, 478, 248/486, 479, 284, 900; 350/604, 631, 632

[56] References Cited

U.S. PATENT DOCUMENTS

| 4,548,483 | 10/1985 | Moro et al. | 248/900 X |
| 4,740,066 | 4/1988 | Whitehead | 350/631 X |

FOREIGN PATENT DOCUMENTS

| 3001906 | 7/1981 | Fed. Rep. of Germany | 350/632 |
| 0050046 | 3/1985 | Japan | 350/632 |
| 0146742 | 8/1985 | Japan | 350/632 |
| 0146743 | 8/1985 | Japan | 350/632 |
| 0161230 | 8/1985 | Japan | 350/632 |
| 0240540 | 11/1985 | Japan | 350/632 |
| 0071244 | 4/1986 | Japan | 350/632 |

Primary Examiner—Robert W. Gibson, Jr.
Assistant Examiner—Karen J. Chotkowski
Attorney, Agent, or Firm—Becker & Becker, Inc.

[57] ABSTRACT

An exterior mirror for a vehicle, including a base mounted on the vehicle, and a housing, for a mirror body, mounted on the base in such a way as to be pivotable to the front and to the rear relative to the forward direction of travel of the vehicle. A lever arm is mounted on the base in such a way as to be pivotable in the direction of pivot of the housing. One end of a swivel arm is directed toward the base and is hingedly connected with the lever arm. One end of a tension spring is connected to that end of the swivel arm that is remote from the base. A second end of the tension spring is connected to the base in the vicinity of where the lever arm is mounted on the base. The housing is connected to the swivel arm, in the vicinity of that end of the latter remote from the base, in such a way that the housing is pivotable about either its front or rear edge against the force of the tension spring.

12 Claims, 3 Drawing Sheets

EXTERIOR MIRROR FOR A VEHICLE

BACKGROUND OF THE INVENTION

The present invention relates to an exterior mirror, for example a side view or rear view mirror, for a motor vehicle. The mirror includes a base that is adapted to be mounted on the vehicle, and a housing that accommodates a mirror body and is mounted on the base in such a way as to be pivotable to the front and to the rear, relative to the longitudinal direction or forward direction of travel of the vehicle, against the force of a spring.

With the heretofore known mirrors of this general type, the housing is essentially held in the rest position by spring force. This spring force must be overcome if, for example when an impact or other force is applied to the mirror, the housing is to be pivoted for safety reasons. This known type of retention for the mirror body has the drawback that in the normal position of the housing, not inconsiderable stresses or tensions are effective; this is particularly disadvantageous when the parts are made of plastic. In addition, over time a spring tension is not always assured.

It is therefore an object of the present invention to improve a vehicle mirror of the aforementioned general type in such a way that the spring tension can be very slight in the normal position of the housing.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
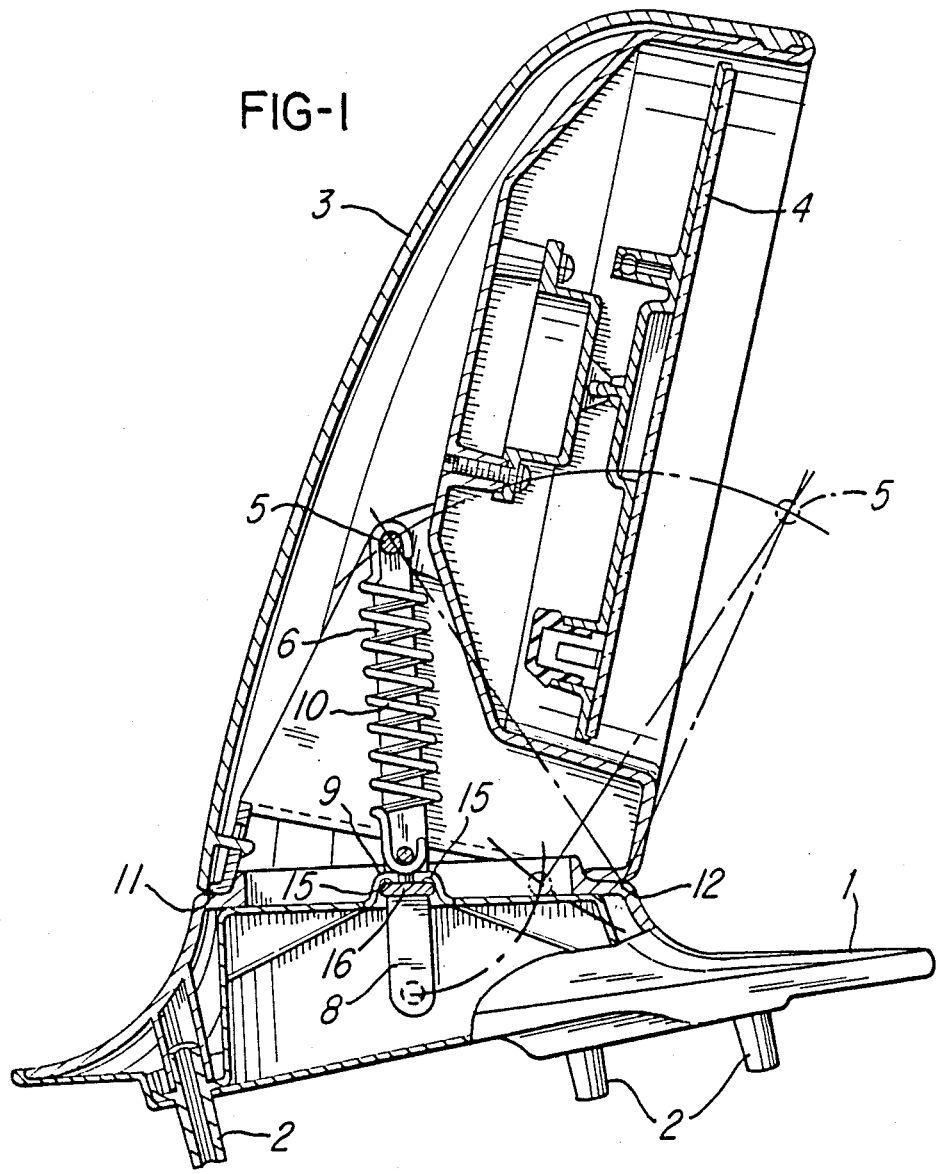
FIG. 1 is a partial, horizontal, cross-sectional view, in the normal position of the mirror housing, of one exemplary embodiment of the inventive exterior rear view mirror for a passenger car.

The mirror of the present invention comprises: a lever arm that is mounted on the base in such a way as to be pivotable in the direction of pivot of the mirror housing, especially to a limited extent; a swivel arm having a first end that is remote from the base, and a second end that is directed toward the base and is hingedly connected with the lever arm; and a tension spring having a first end that is connected to the first end of the swivel arm, and a second end that is connected to the base in the vicinity of where the lever arm is mounted on the base, with the housing, when viewed in the forward direction of travel of the vehicle, having a front edge that faces the base and a rear edge that faces the base, with the housing being connected to the swivel arm, in the vicinity of the first end thereof, in such a way that the housing is selectively pivotable about its front and rear edges against the force of the tension spring.

With the inventive embodiment of the mirror, the swivel arm and the lever arm follow the pivoting movement of the housing, with the point of connection between the swivel arm and the lever arm moving to within the vicinity of the pivot location of the housing. The important thing in this connection is that the aforementioned tension spring is not tensioned, i.e. does not achieve an appreciable tension, until the housing has completed its pivot movement. In so doing, a knee-lever-like effect occurs. When the housing is again straightened out, i.e. is returned to its normal position, the swivel arm and the lever arm are also returned, and in particular are again aligned with one another, whereby in the normal position of the housing these two elements, namely the swivel arm and the lever arm, extend transverse to the longitudinal direction of the vehicle and at right angles to the plane defined by the two pivot locations or support surfaces that the housing provides for the mirror housing.

In order, as mentioned above, to limit the extent to which the housing can pivot, an abutment or limit stop can be provided on the base to establish an end position for the swivel arm and hence for the housing.

Pursuant to one specific embodiment of the present invention, the length of the swivel arm can be approximately 3-5 times greater than the length of the lever arm, and is preferably approximately 4 times as long.

Further specific features of the present invention will be described in detail subsequently.

DESCRIPTION OF PREFERRED EMBODIMENTS

Referring now to the drawings in detail, the base 1 of the mirror is provided with attachment elements 2 for mounting the mirror on a vehicle. The shell-shaped housing 3 of the mirror serves to accommodate the mirror body 4, which can be adjusted in all directions.

At approximately one third of the length of the housing 3, the latter is provided with a pin 5 that is disposed approximately vertically. The pin 5 serves for the mounting of a swivel arm 6 that comprises two elements. That end of the swivel arm 6 that is directed toward the vehicle, i.e. toward the base 1, is hingedly connected, about an approximately vertical pivot axis, to the free end of a lever arm 8, which also comprises two elements. Disposed parallel to this pivot axis, and also parallel to the pin 5, is a support 9 for that end of the lever arm 8 that faces the housing 3. This end of the lever arm 8 extends somewhat beyond the support 9 so that a tension spring 10 can be attached thereto. The other end of the tension spring 10 is secured to the pin 5.

Disposed approximately at the level of the support 9 are two support locations 11, 12 for that edge of the housing 3 that faces the base 1 and is disposed toward the front in the forward direction of travel of the vehicle, and for that edge of the housing 3 that faces the base 1 and is disposed toward the back when viewed in the forward direction of travel of the vehicle. In the normal position of the housing 3 illustrated in FIG. 1, these two edges of the housing 3 rest upon their support locations 11 and 12; in this position, the tension spring 10 is essentially not tensioned. The retention or fixation of the housing 3 is effected by the aligned parts 6, 8, which in this position extend approximately perpendicular to a plane defined by the two support locations 11, 12.

Figure 2:
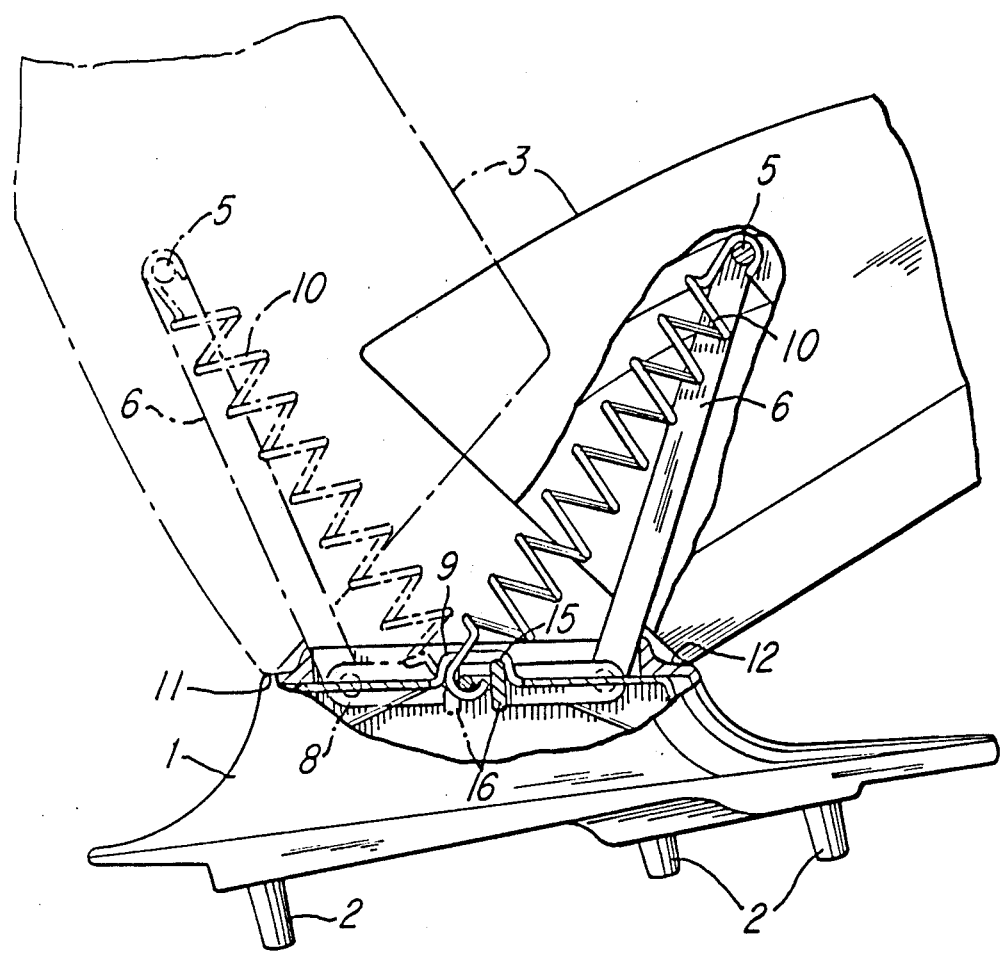
FIG. 2 is also a partial, horizontal, cross-sectional view of the mirror of FIG. 1, with the housing pivoted.

If as shown in FIG. 2 a force is applied to the housing 3 counter to the forward direction of travel of the vehicle, the housing 3 tilts or pivots on the support location or surface 12 about the rear edge of the housing. In so doing, both the swivel arm 6 and the lever arm 8 are deflected in a similar direction. During this process, the spring 10 is tensioned. The final position of the housing 3 is illustrated in FIG. 2. In this position, the lever arm 8 extends approximately parallel to the aforementioned plane, with a rounded-off projection 15 on the lever arm 8 being disposed in a rounded-out recess of the support 9. The swivel arm 6 cannot pivot any further, being prevented from doing so by the base 1 (see FIG. 2), so that a maximum pivoting of approximately 90° is provided for. Since the point of attachment of the tension spring 10 does not coincide exactly with the pivot axis of the lever arm 8, with said pivot axis being disposed in the recess where the projection 15 is located, the tension spring 10 actually tries to return the lever arm 8 to the position illustrated in FIG. 1. However, such a return cannot occur because the housing 3 is supported upon the support surface 12 and the swivel arm 6 prevents the housing from returning to the position illustrated in FIG. 1. In this way, the housing 3 is maintained in the position illustrated in FIG. 2. Not until the housing 3 is pivoted back by hand into the normal position illustrated in FIG. 1 does the pin 5 advance relative to the support surface 12, whereupon the tension spring 10 is then shifted into the position that pivots the lever arm 8 in a direction toward the vehicle. In so doing, the swivel arm 6 again more and more assumes a position that corresponds to the position illustrated in FIG. 1. In the end position, the swivel arm 6 and the lever arm 8 are again aligned.

The normal position illustrated in FIG. 1 is not unstable, because the cross-sectional shape of the crosspiece 16, which essentially ends the lever arm 8 in the direction toward the housing 3, is flat rectangular or square. In other words, a flat support surface of this crosspiece 16 rests upon a similarly shaped support surface of the support 9. This broad support prevents undesired tilting or pivoting. In addition, the position of the housing 3 is assured, because both edges of the housing rest upon the support locations or surfaces 11, 12.

If the housing 3 is tilted in the forward direction of travel, similar processes ensue, as indicated by the dot-dash and dashed lines in FIG. 2.

The lever arrangements and engagement of the tension spring 10 are comparable to a flip-over knee lever mechanism that shifts or flips over in both of the aforementioned directions, yet is secured in the middle position via the support 9, and is also initially prevented from carrying out a pivoting movement as a consequence of the support of the housing 3 on the support locations or surfaces 11, 12. Also important in this connection is the engagement, on both sides, of the projections 15 in the pertaining, rounded-off recesses of the support 9, since a double lever results from the lever arm 8, and a lever arm for attachment of the tension spring 10 is formed on the other side of the crosspiece 16. As a result, the lever arm 8 can be returned to the position illustrated in FIG. 1.

Figure 3:
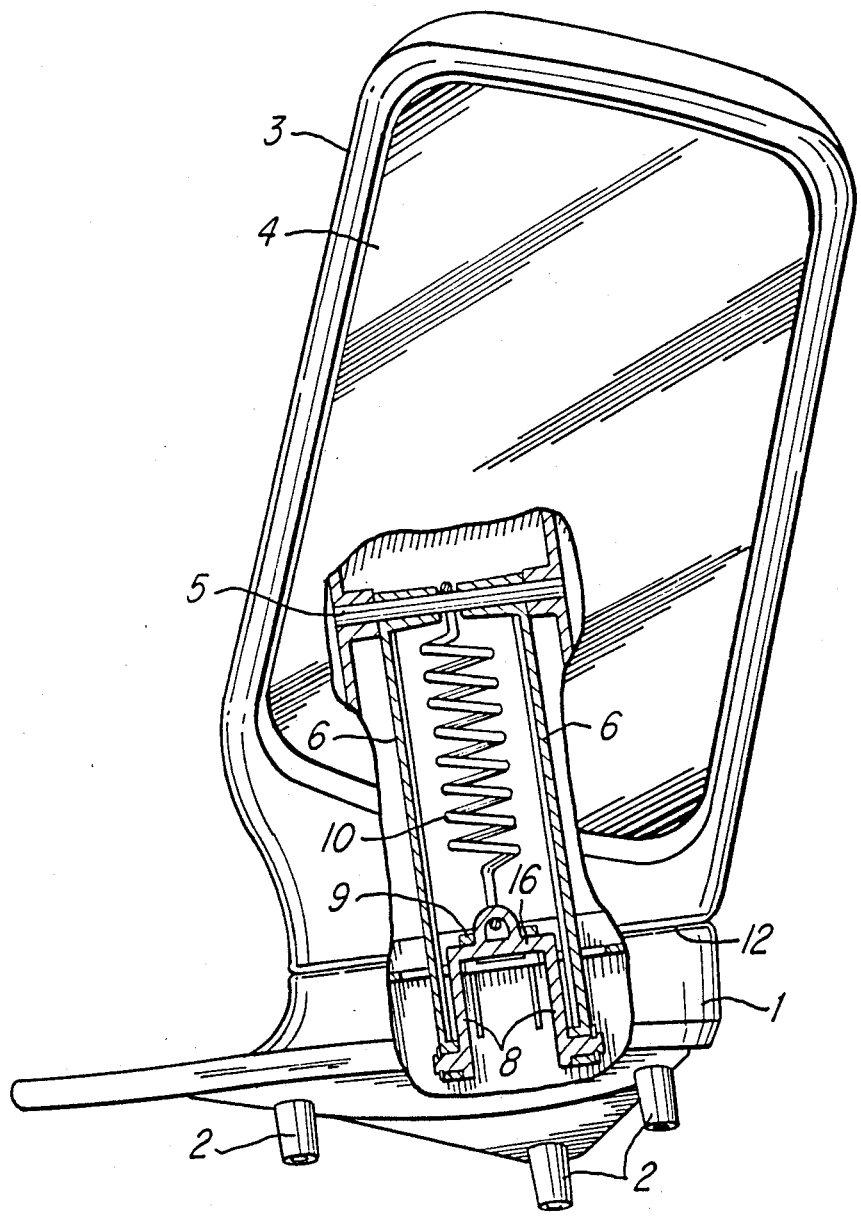
FIG. 3 is a partial, vertical, cross-sectional view of the mirror of FIG. 1.

In order to be able to stabilize the lever mechanism transverse to the pivot direction of the housing 3, the swivel arm 6 and the lever arm 8 are embodied as twin elements; in other words, as clearly illustrated in FIG. 3, each of these elements comprises two parallel arms, the free ends of which are either sufficiently interconnected or are connected to the other element.

The present invention is, of course, in no way restricted to the specific disclosure of the specification and drawings, but also encompasses any modifications within the scope of the appended claims.

What we claim is:

1. An exterior mirror for a motor vehicle, including a base that is adapted to be mounted on the vehicle, and a housing that accommodates a mirror body and is mounted on said base in such a way as to be pivotable to the front and to the rear, relative to the forward direction of travel of said vehicle; said mirror further comprises:
   a lever arm;
   first pivoting means for pivotably mounting said lever arm on said base in such a way that said lever arm is pivotable in the direction of pivot of said mirror housing;
   a swivel arm having a first end that is remote from said base, and a second end that is directed toward said base;
   means for hingedly connecting said second end of said swivel arm with said lever arm;
   a tension spring having a first end that is connected to said first end of said swivel arm, and a second end that is connected to said base in the vicinity of where said lever arm is mounted on said base, with said housing, relative to said forward direction of travel of said vehicle, having a front edge that faces said base and a rear edge that faces said base; and
   second pivoting means for connecting said housing to said swivel arm, in the vicinity of said first end thereof, in such a way that said housing is selectively pivotable about the front and rear edges thereof against the force of said tension spring.

2. A mirror according to claim 1, in which said lever arm includes a portion that extends slightly beyond where said lever arm is linked to said base, with said tension spring being connected to said extending portion of said lever arm.

3. A mirror according to claim 1, in which in a normal, non-pivoted position of said housing, said lever arm and said swivel arm are essentially aligned with one another and extend approximately perpendicular to a plane determined by support locations provided on said base for said front and rear edges of said housing.

4. A mirror according to claim 3, in which said base is provided with a support against which said lever arm rests flush in a normal, non-pivoted position of said housing, with said lever arm being provided, on opposite sides, with rounded-off projections that are adapted to engage in corresponding rounded-out recesses of said support.

5. A mirror according to claim 4, in which in said normal position of said housing said tension spring is, at most, tensioned only very slightly.

6. A mirror according to claim 3, in which in a pivoted position of said housing, said lever arm extends approximately parallel to said plane of said support locations and points in the direction toward that support location upon which one of said front and rear housing edges is pivoting.

7. A mirror according to claim 6, in which said base is provided with a limit stop for said swivel arm to limit pivotable movement of said swivel arm to define an end position for said housing.

8. A mirror according to claim 1, in which said swivel arm and said lever arm are each comprised of parallel twin elements such that during pivoting and in a pivoted position, said housing is rigidly mounted transverse to the direction of pivot.

9. A mirror according to claim 8, in which said tension spring is disposed between said twin elements.

10. A mirror according to claim 1, in which said base is provided with support locations for said front and rear edges of said housing; and in which said swivel arm extends into said housing to such an extent that during pivoting of said housing, said first end of said swivel arm extends beyond, i.e. to the front or rear of, the pertaining support location relative to the forward direction of travel of said vehicle.

11. A mirror according to claim 1, in which the length of said swivel arm is approximately 3–5 times the length of said lever arm.

12. A mirror according to claim 11, in which the length of said swivel arm is approximately 4 times the length of said lever arm.

* * * * *